Figure 1:
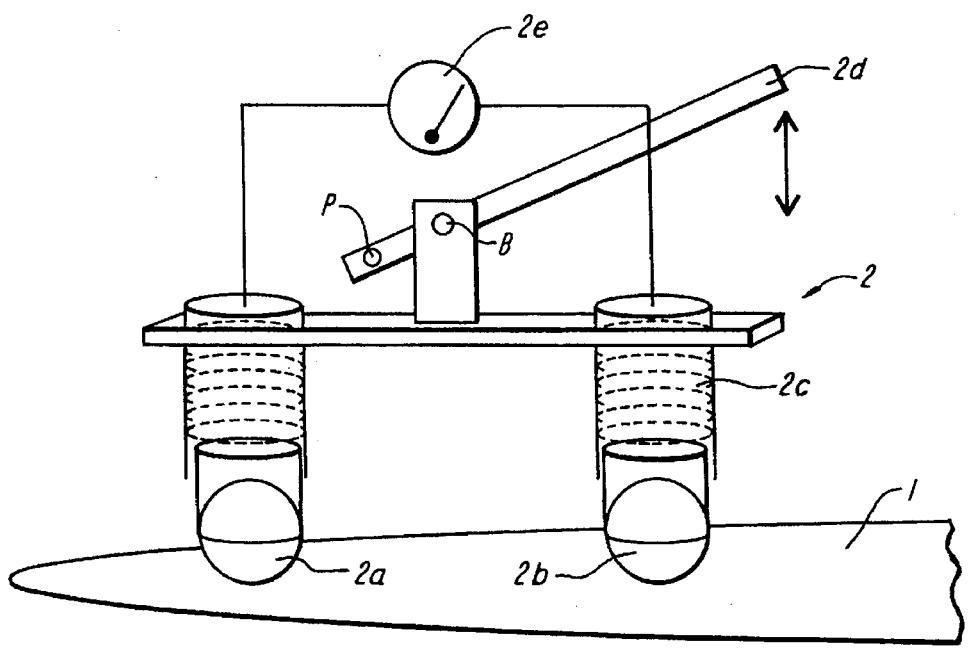

United States Patent
Mahvan et al.

[11] Patent Number: 5,660,695
[45] Date of Patent: Aug. 26, 1997

[54] METHODS FOR EVALUATING THE EFFECTIVENESS OF PROTECTIVE OVERCOATS FOR THIN FILM, MAGNETIC DISK MEDIA

[75] Inventors: Nader Mahvan; Atef H. Eltoukhy, both of Santa Clara County, Calif.

[73] Assignee: StorMedia, Inc., Santa Clara, Calif.

[21] Appl. No.: 375,961

[22] Filed: Jan. 20, 1995

Related U.S. Application Data

[63] Continuation of Ser. No. 26,509, Mar. 4, 1993, abandoned.

[51] Int. Cl.$^6$ .................................................. C23C 14/34
[52] U.S. Cl. ........................... 204/192.13; 204/192.16; 204/192.2; 427/8; 427/10
[58] Field of Search ..................... 204/192.13, 192.15, 204/192.16, 192.2; 427/8, 10; 324/713, 717, 693

[56] References Cited

U.S. PATENT DOCUMENTS 5,045,165 9/1991 Yamashita ........................ 204/192.16
5,264,797 11/1993 Dahlstrom ............................. 427/10

*Primary Examiner*—R. Bruce Breneman
*Assistant Examiner*—Rodney G. McDonald
*Attorney, Agent, or Firm*—Lahive & Cockfield

[57] ABSTRACT

A method for manufacturing thin film magnetic media disks entailing the improvement arising from causing spaced electrical probes to engage spaced portions of an exposed outer surface of a disk overcoat layer; creating a voltage across the spaced electrodes; measuring a function of electrical resistance between the ends of the probes in engagement with the exposed outer surface of the overcoat layer; and employing this measured resistance function generally as a measure of wear properties of the overcoat layer.

3 Claims, 2 Drawing Sheets

METHODS FOR EVALUATING THE EFFECTIVENESS OF PROTECTIVE OVERCOATS FOR THIN FILM, MAGNETIC DISK MEDIA

This application is a continuation of application Ser. No. 026,509 filed on Mar. 4, 1993, now abandoned.

BACKGROUND AND SUMMARY OF INVENTION

This invention pertains to unique techniques for evaluating the effectiveness or wear efficacy of protective overcoats applied to thin film magnetic disk media. In particular, the invention relates to such techniques as applied to the evaluation of protective carbon overcoat layers which are sputter deposited upon thin film magnetic media in the presence of hydrogen.

To a substantial extent, the success of commercial product ventures is determined by the ability of manufacturers to maintain adequate product performance parameters or standards.

In order to achieve such objectives, manufacturers traditionally rely upon extensive testing and evaluation procedures. Such tend to become costly and can add significantly to the market costs of products.

Incremental additions of cost relating to product testing for adequacy purposes can adversely impact the competitive strength or position of the product manufacturer. In addition, or alternatively, such costs can become a cost increase burden to be borne by the consumer.

In any event, in highly competitive markets, such as those involving the manufacture of thin film magnetic disk media, both customer and competitive considerations require that high quality products be produced with maximum cost efficiency.

The present invention is directed to a particularly successful effort to deal with the evaluation of acceptable operational parameters for magnetic media of the sputtered, thin film type, particularly such which are provided with protective carbon overcoat layers.

This invention affords a unique recognition of the manner in which simple, conventional electrical measurement techniques may be utilized, in a surprising yet efficient manner, to evaluate the mechanical, wear resistant properties of magnetic media, thin film overcoats, such as those provided by carbon applied by sputter coating techniques to previously sputtered magnetic media layers. Preferably, the carbon is sputtered in the presence of hydrogen so as to effect hydrogenation of the carbon overcoat layer.

Such hydrogenation is desired for the purpose of improving the hardness of the applied carbon overcoat and thus improving its wear resistance.

This invention entails three distinct, but to some extent overlapping, aspects as follows:

A. A first, broad, generic aspect entailing the utilization of electrical surface resistance measurements, performed on the exposed outer surface of magnetic media protective overcoat layers so as to afford an empirical indication of adequate hardness or wear surface characteristics;

B. A second aspect, by virtue of which the measurement of electrical resistance of the exposed outer surface of a protective overcoat layer such as carbon, sputtered in the presence of hydrogen, functions to provide an empirical indication of the degree of hydrogenation or acceptable hardness of the sputtered overcoat layer; and/or C. A third aspect, by virtue of which the measurement of electrical resistance of the exposed outer surface of a protective overcoat layer, such as sputtered carbon, is employed to provide an empirical indication of the degree or presence of abnormally high peaking of generally isolated, elevated, peak like configurations of sputtered carbon (this phenomena will be hereinafter referred to as "peaking density", i.e., a measurement of the extent to which unusually high or elevated carbon, point-like configurations are formed during the sputtering process and which project above the normal roughened surface provided by the carbon sputtering operation. Such "peaks" provide potential interference with the magnetic read/write head which is employed to read or write data in relation to the protected media.

The first aspect of the invention, i.e., the generic aspect, is characterized as follows, first with respect to overall manufacturing considerations and second with respect to the product evaluation step itself related to the use of electrical resistance to provide an empirical indication of surface characteristics such as acceptable hardness, peak density, etc.

As to the overall manufacturing operation, this first method aspect may be characterized as follows:

A method is provided for empirically determining the protective characteristics of an overcoat layer for thin film magnetic media disks, this method comprising:

providing a disk substrate;

sputter depositing thin film magnetic media layer means on the substrate;

depositing an overcoat layer over the magnetic media thin film means;

causing spaced electrical probes to engage spaced portions of an exposed outer surface of the carbon overcoat;

creating a voltage across the spaced electrical probes;

measuring a function of electrical resistance between the ends of the probes in engagement with the exposed outer surface of the carbon overcoat;

the measured resistance being a function of the wear properties of said overcoat layer; and empirically determining, in response to the aforesaid measured resistance, a commercially acceptable wear property of the overcoat layer.

With respect to the resistance measuring step of the generic aspect of the invention, this step may be viewed in the following format:

At the outset, a method is afforded for manufacturing thin film magnetic media disks, which method comprises providing a disk substrate, sputter depositing thin film magnetic media layer means on the substrate, and sputter depositing an overcoat layer over said magnetic media thin film means.

The improvement in this method, provided by a first aspect of this invention comprises:

causing spaced electrical probes to engage spaced portions of an exposed outer surface of the overcoat layer;

creating a voltage across the spaced electrodes;

measuring a function of electrical resistance between the ends of the probes in engagement with the exposed outer surface of the overcoat layer; and employing the measured resistance generally as a measure of wear properties of said overcoat layer.

With respect to the second aspect of the invention (i.e., the utilization of surface resistance to provide an indication of the degree of hydrogenation of the protective overcoat, preferably sputtered carbon), the invention again may be considered from the standpoint of the overall manufacturing operation, and from the standpoint of the step involved in the resistance measurement hydrogenation evaluation itself.

With respect to the former, this aspect of the invention is defined in the following form:

A method for empirically determining the degree of hydrogenation of a protective carbon coating for thin film magnetic media disks, this method comprising:

providing a disk substrate;

sputter depositing thin film magnetic media layer means on the substrate;

sputter depositing a carbon overcoat over the magnetic media thin film means in the presence of hydrogen;

causing spaced electrical probes to engage spaced portions of an exposed outer surface of the carbon overcoat;

creating a voltage across the spaced electrical probes;

measuring a function of electrical resistance between the ends of the probes in engagement with the exposed outer surface of said carbon overcoat;

this measured resistance function being an indicator of the degree of hydrogenation of the carbon overcoat; and empirically determining, in response to the measured resistance, a commercially acceptable degree of hydrogenation of said carbon overcoat.

With respect to the resistance measurement/hydrogenation evaluation step of this second aspect of the invention, the following format is presented:

To begin with, a method for manufacturing thin film magnetic media disks, is provided which comprises providing a disk substrate, sputter depositing thin film magnetic media layer means on the substrate, and sputter depositing a carbon overcoat over the magnetic media thin film means in the presence of hydrogen.

The improvement of this invention in this method comprises:

causing spaced electrical probes to engage spaced portions of an exposed outer surface of the carbon overcoat;

creating a voltage across the spaced electrodes;

measuring a function of electrical resistance between the ends of the probes in engagement with the exposed outer surface of the carbon overcoat; and employing the measured resistance generally as a measure of hydrogenation of the carbon overcoat.

The third aspect of the invention, relating to the use of electrical resistance measurements on the exposed outer surface of the protective layer overlying thin film magnetic disk media to provide an indication of peaking density, etc., may also be considered in multiple formats as follows.

With respect to overall manufacturing, this third aspect of the invention may be considered as follows:

A method is provided for empirically determining acceptable surface roughness characteristics of thin film magnetic media disks, this method comprising:

providing a disk substrate;

sputter depositing thin film magnetic media layer means on the substrate;

sputter depositing a carbon overcoat over the magnetic media thin film layer means;

prior to the completion of the manufacturing method, providing surface roughness on the exposed outer surface of the deposited carbon overcoat;

causing spaced electrical probes to engage spaced portions of the exposed outer surface of the carbon overcoat;

creating a voltage across the spaced electrical probes;

measuring a function of electrical resistance between the ends of the probes in engagement with the exposed outer surface of the carbon overcoat;

this measured resistance being a function of peaking density of the carbon overcoat; and empirically determining, in response to the measured resistance, a commercially acceptable degree of surface texturing of the carbon overcoat.

Again, in the context of overall manufacturing, but focusing specifically upon peaking density indications of the sputtered carbon overcoat, the following presentation of the invention is applicable.

A method for empirically determining acceptable surface roughness characteristics of thin film magnetic media disks is provided, which method comprising:

providing a disk substrate;

sputter depositing thin film magnetic media layer means on this substrate;

sputter depositing a protective overcoat over the magnetic media thin film means;

this manufacturing method, prior to the completion thereof, being operable to provide surface roughness on the exposed outer surface of the deposited protective overcoat;

causing spaced electrical probes to engage spaced portions of the exposed outer surface of the protective overcoat;

creating a voltage across the spaced electrical probes;

measuring a function of electrical resistance between the ends of the probes in engagement with the exposed outer surfaces of the protective overcoat;

the measured resistance function being a function of peaking density of the protective overcoat; and empirically determining, in response to this measured resistance function, a commercially acceptable degree of surface texturing of said protective overcoat.

With respect to the resistance measurement step itself being employed as an empirical indication of acceptable surface roughness and/or peak density characteristics, the following is applicable:

A method is contemplated for empirically determining acceptable surface roughness characteristics of thin film magnetic media disks, this method comprising:

causing spaced electrical probes to engage spaced portions of an exposed outer surface of a media disk;

creating a voltage across the spaced electrode probes; and measuring a function of electrical resistance between the ends of the probes in engagement with the exposed outer surface of the disk media;

the measured resistance function being employed as a function of outer surface roughness of the media disk.

Any or all of the foregoing aspects of the invention are considered to entail particularly advantageous characteristics in the context of evaluation of a sputtered carbon overcoat applied in the presence of hydrogen.

Moreover, an enhancement of individual aspects of the invention, as heretofore presented, is achieved through the application of uniform pressure to the probes employed to engage wear resistance surface or overcoats for the purpose of making electrical resistance measurements. Preferably such uniform pressure entails not only the application of uniform final pressure, but the application of uniform rates of application of probe pressure as well.

II. DRAWINGS

In presenting the invention in the context of presently preferred embodiments, reference will be made to the appended drawings.

Figure 4:
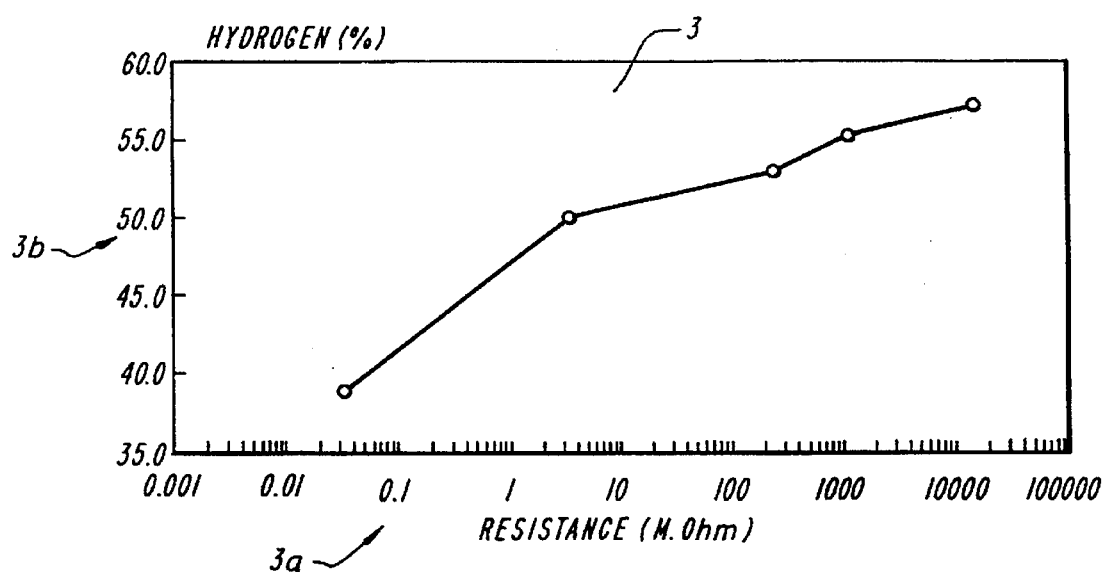
Figure 2:
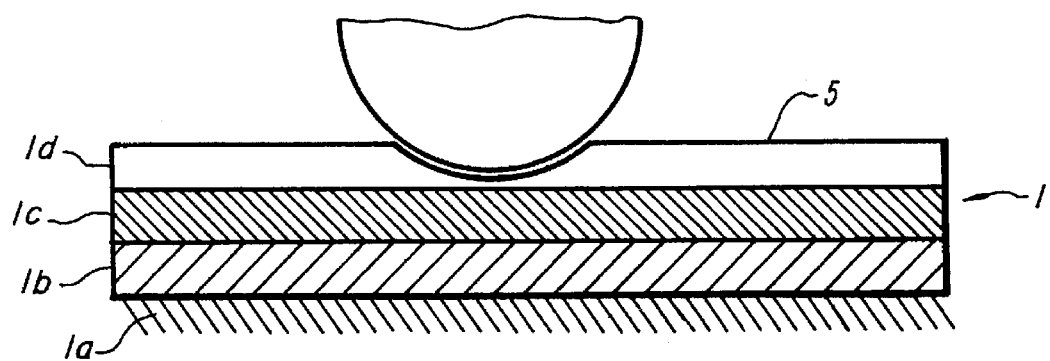
Figure 3:
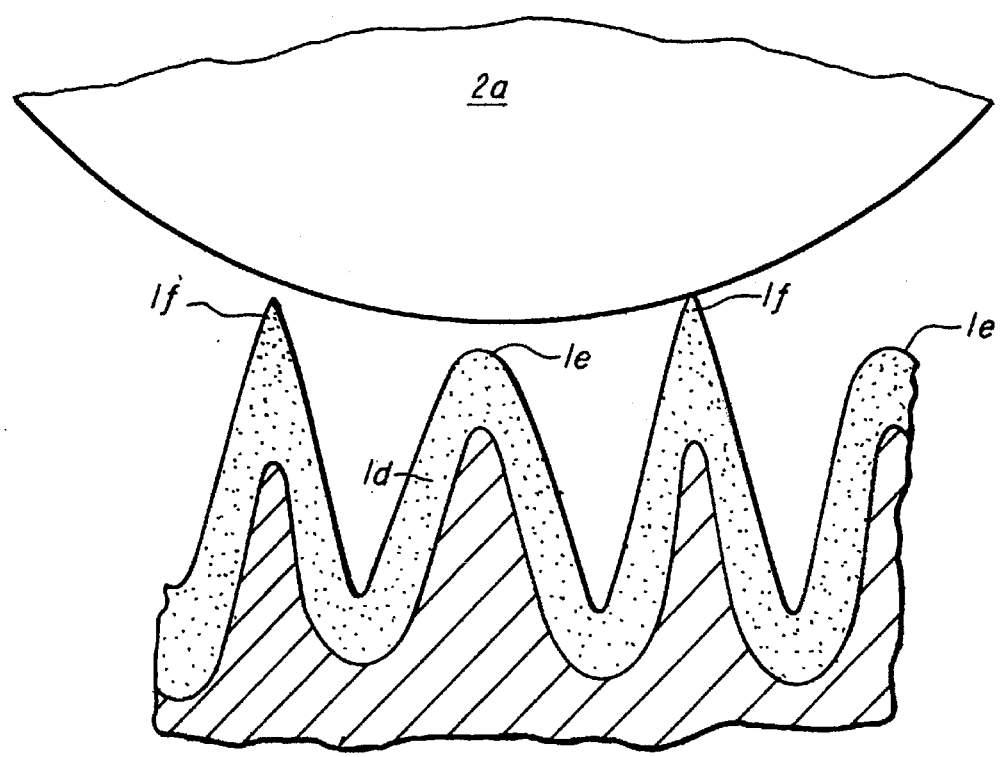

In the appended drawings, FIG. 1 provides a schematic, fragmentary, perspective view illustrating an electrical resistance measuring apparatus being employed to measure electrical resistance characteristics of the exposed outer wear resistant surface of a thin film, magnetic media disk;

FIG. 2 provides an enlarged, sectional, vertical elevation view of a portion of the disk being evaluated in FIG. 1, illustrating sputtered layers of this disk and the manner in which the resistance measuring probes engage the exposed outer surface of the disk overcoat or protective layer;

FIG. 3 provides a fragmentary, still further enlarged view of the portion of FIG. 2 in the vicinity of probe engagement, illustrating carbon peak configurations which are intended to be detected so as to provide an indication of acceptable/ unacceptable carbon peak density or extent of formation, in order to avoid the production of commercially unacceptable disk product; and FIG. 4 provides a comparative chart illustrating the manner in which the degree of carbon layer hydrogenation, as provided during the overcoat sputtering process in the presence of hydrogen, may be empirically or generally correlated with surface resistance measurements so as to provide a uniquely effective, simple, and inexpensive way of ensuring the manufacture of Commercially acceptable product.

Having summarized the drawings, it is now appropriate to give further consideration to a detailed description of presently preferred embodiments of the invention.

III. DETAILED DESCRIPTION OF PRESENTLY PREFERRED EMBODIMENTS OF THE INVENTION

In describing presently preferred embodiments of the invention, an overview of the invention will first be presented, following which the hydrogenation, peaking density, and generic aspects of the invention, heretofore noted, will be sequentially considered.

A. Overview

With respect to the invention as depicted in the drawings, it will be noted that in FIG. 1 there is schematically shown a magnetic media disk 1 which is formed by conventional, commercially available sputter coating operations.

As is schematically shown in FIG. 2, the disk 1, in section, is shown as being made up of a substrate layer 1a, usually aluminum, a sputter deposited chromium layer 1b, a magnetic, media layer 1c and a carbon overcoat or outer layer 1d.

The carbon overcoat layer 1d, like the chromium 1b and the magnetic layer 1c, is sputter deposited. In the case of the carbon overcoat layer, it is sputter deposited in the presence of hydrogen so as to effect the hydrogenation of the sputter coated and deposited carbon overcoat, thereby affording an enhanced degree of surface hardness, resulting from the hydrogenation of the carbon.

As is shown in FIG. 3, the normal, or desired surface roughness level of the sputter deposited carbon is generally indicated by acceptable elevation point 1e, with excessive elevation or brittle carbon peaks being generally identified as high peaks or excessive peaks 1f.

With respect to the electrical resistance apparatus which is employed in measuring surface resistance of the protective overcoat layer, FIG. 1 shows this apparatus 2 to be made up of two overcoat engaging probes or contacts 2a and 2b.

As is shown in FIG. 1, each of these probes may be biased by a standard biasing force, schematically represented by a spring 2c so as to provide a uniform, surface engaging probe force.

A schematically shown probe lowering and disk pressing mechanism 2d, i.e., a handle secured at a pivot P to a fixed apparatus and supporting the probe assembly at a bracket B serves, when depressed downwardly as shown in FIG. 2, to urge the resistance probes 2a and 2b into engagement with the exposed carbon overcoat layer 1b. With the probes thus engaged, and preferably with the engagement force being uniform throughout the series of measurements employed in manufacturing and the rate of application of the probes being generally uniform, an indication of electrical resistance of the surface 1d between the probes 2a and 2b may be provided by a conventional instrument 2e for indicating electrical resistance, as schematically shown in FIG. 1.

Where the electrical resistance indication provided by readout unit 2e illustrates essentially a short circuited condition between the probes 2a and 2b, this is an indication that the probes have engaged a disk having excessive peaking density, i.e., an unacceptably high number or presence of excessive, carbon peak elevation points. Engagement of the probes with such brittle and isolated peaks will tend to cause the peaks to break, crush or fail, thereby using the probes to essentially short circuit through the carbon layer directly into the highly conductive magnetic media layer 1c. An indication of such high conductivity or short circuiting immediately tells an operator making the evaluation that excessive peaking density has occurred.

Desirably, and normally, the operator making surface resistance measurements will be primarily concerned with where the measurement of surface resistance is determined on a plot generally of the type shown in FIG. 4, i.e. concerned with overall surface hardness.

In this chart 3, correlating surface resistance with the degree of carbon hydrogenation, the X axis or abcissa, depicted by 3a, affords a progressive indication of surface resistance of the exposed outer surface of the carbon or protective layer 1d. This resistance correlates empirically with degrees of hydrogenation as shown on the ordinate axis or "Y" axis 3b.

With this correlation being recognized and utilized as presented in this invention, an operator can readily determine, through simple resistance measurements, whether or not a disk being evaluated has an overcoat or sputtered, hydrogenated carbon layer meeting acceptable hardness parameters. This results since the degree of hydrogenation is itself a function of carbon layer hardness, i.e., the greater the degree of hydrogenation, the greater the degree of sputtered hydrogenated carbon hardness and thus the greater the degree of wear resistance.

B. Hydrogenation Aspect

From an overall manufacturing standpoint, the carbon hydrogenation method presented through this invention may be viewed as follows:

A method is presented for empirically determining the degree of hydrogenation of a protective carbon coating for thin film magnetic media disks, this method comprising:

providing a disk substrate 1a;

sputter depositing thin film magnetic media 1b, 1c layer means on this substrate;

sputter depositing a carbon overcoat 1d over the magnetic media thin film means in the presence of hydrogen;

causing spaced electrical probes 2a, 2b to engage spaced portions of an exposed outer surfaces of the carbon overcoat 1d;

creating a voltage across the spaced electrical probes 2a, 2b;

measuring with apparatus 2, a function of electrical resistance between the ends of the probes 2a, 2b in engagement with the exposed outer surfaces of the carbon overcoat 1d;

the measured resistance or function thereof as depicted at 2e being a function of the degree of hydrogenation of the carbon overcoat 1d; and empirically determining, in response to this measured resistance, a commercially acceptable degree of hydrogenation of the carbon overcoat 1d.

In the context of the product evaluation step itself, the following method aspects apply:

A method is herein afforded for manufacturing thin film magnetic media disks, which method, at the outset, comprises providing a disk substrate 1a, sputter depositing thin film magnetic media layer means 1b, 1c on the substrate 1a, and sputter depositing a carbon overcoat 1d over this magnetic media thin film means in the presence of hydrogen.

In the improvement provided through this invention, the following steps ensue:

causing spaced electrical probes 2a, 2b to engage spaced portions of an exposed outer surfaces of the carbon overcoat 1d;

creating a voltage across the spaced electrodes 2a, 2b;

measuring a function of electrical resistance between the ends of the probes 2a, 2b in engagement with the exposed outer surfaces of the carbon overcoat 1d; and employing the measured resistance generally as a measure of hydrogenation of the carbon overcoat 1d.

C. Peak Density Aspects

Those aspects of the invention arising from, and/or relating to surface roughness and/or peaking density evaluations, may be characterized as follows:

In the context of overall disk manufacture, a method is presented for empirically determining acceptable surface roughness characteristics of thin film magnetic media disks, which method comprises:

providing a disk substrate 1a;

sputter depositing thin film magnetic media layer means 1b, 1c on the substrate 1a;

sputter depositing a carbon overcoat 1d over the magnetic media thin film means 1b, 1c;

this method, prior to the completion thereof, being operable to provide surface roughness 1e on the exposed outer surface of the deposited carbon (due to nucleated growth of magnetic media layer 1c) overcoat;

causing spaced electrical probes 2a, 2b to engage spaced portions of said exposed outer surfaces of the carbon overcoat 1d;

creating a voltage across the spaced electrical probes 2a, 2b;

measuring with apparatus 2, a function of electrical resistance between the ends of the probes 2a, 2b in engagement with the exposed outer surfaces of the carbon overcoat 1d;

the measured resistance being a function of peaking density of the carbon overcoat, i..e., the presence of brittle carbon peaks or spikes "projecting" above normal elevation level 1e; and empirically determining, in response to the measured resistance, a commercially acceptable degree of surface texturing of the carbon overcoat.

As to the surface evaluation step itself, a method is herein presented for empirically determining acceptable surface roughness characteristics of thin film magnetic media disks, which method comprises:

providing a disk substrate 1a;

sputter depositing thin film magnetic media layer means 1b, 1c on this substrate 1a;

sputter depositing a protective overcoat 1d over the magnetic media thin film means b, 1c;

this method, prior to the completion thereof, being operable to provide surface roughness 1e on the exposed outer surfaces of the deposited protective overcoat 1d;

causing spaced electrical probes 2a, 2b to engage spaced portions of the exposed outer surfaces of the protective overcoat 1d;

creating a voltage across the spaced electrical probes 2a, 2b into apparatus 2;

measuring a function of electrical resistance between the ends of the probes 2a, 2b in engagement with the exposed outer surfaces of the protective overcoat 1d;

the measured resistance as noted at readout 2e being a function of peaking density of the protective overcoat 1d;

empirically determining, in response to the measured resistance, a commercially acceptable degree of surface texturing of the protective overcoat; and throughout a series of these resistance measurements on different media disks 1, generally maintaining a predetermined pressure, with means 2c, 2d, urging each of the electrical probes into the protective overcoat;

thereby tending to cause the resistance measurements for the different media to be a function of relative peaking density of the protective overcoat.

More broadly speaking, an evaluation method is presented for empirically determining acceptable surface roughness characteristics of thin film magnetic media disks, this method comprising:

causing spaced electrical probes 2a, 2b to engage spaced portions of an exposed outer surfaces of a media disk 1;

creating a voltage across these spaced electrode probes 2a. 2b; and measuring a function of electrical resistance between the ends of these probes in engagement with the exposed outer surface of the disk media, this measured resistance being a function of outer surface roughness of said media disk.

D. Generic View of Invention

In a generic sense, encompassing both carbon layer hydrogenation, and peak density or surface hardness characteristic evaluations, the invention may be considered to entail the following method formats.

In relation to overall disk manufacture, a method is presented for empirically determining the protective characteristics of an overcoat layer for thin film magnetic media disks, this method comprising:

provising a disk substrate;

sputter depositing thin film magnetic media layer means on the substrate;

depositing an overcoat layer over the thin film magnetic media layer means;

causing spaced electrical probes to engage spaced portions of an exposed outer surface of the carbon overcoat;

creating a voltage across the spaced electrical probes;

measuring a function of electrical resistance between the ends of the probes in engagement with the exposed outer surface of the carbon overcoat;

this measured resistance being a function of the wear properties of the overcoat layer; and empirically determining, in response to the aforesaid measured resistance, a commercially acceptable wear property of the overcoat layer.

As to the overcoat evaluation itself, the improvement of this invention comprises:

causing spaced electrical probes to engage spaced portions of an exposed outer surface of an overcoat layer;

creating a voltage across the spaced electrodes;

measuring a function of electrical resistance between the ends of the probes in engagement with the exposed outer surface of the overcoat layer; and employing this measured resistance generally as a measure of wear properties of the overcoat layer.

E. Optimization Of Method Aspects Of Invention

In order to optimize and standardize the foregoing surface evaluation techniques, it is considered that the following steps should, desirably, be implemented.

throughout a series of the aforesaid resistance measurements on different media disks, generally maintaining a predetermined pressure urging each of the electrical probes into the exposed outer surface, thereby tending to cause the resistance measurements for different media disks to be a function of relative surface roughness of the exposed outer surfaces thereof.

IV. SUMMARY OF ADVANTAGES AND OVERALL SCOPE OF INVENTION

Through the foregoing presentation, a variety of method aspects of the invention have been presented and reviewed, all concerned with the utilization of simple electrical resistance measurements as a convenient, inexpensive, reliable tool for evaluating the adequacy or efficacy of wear resistance properties of thin film disk magnetic media overcoat layers such as hydrogenated sputtered carbon.

This technique may be performed without involving expensive apparatus, unusually highly skilled personnel, or expensive evaluation techniques.

As a result, the invention is able to provide a reliable, inexpensive manufacturing product evaluation technique, benefiting both the competitive position of the manufacturer and the cost burden of the consumer.

In describing the invention, those skilled in the thin film magnetic media art and familiar with this disclosure may well envision additions, deletions, substitutions, equivalents, or other modifications, all falling within the scope of the appended claims.

What is claimed is:

1. A method for empirically determining acceptable wear resistance and surface roughness characteristics of thin film magnetic media disks, said method comprising:

providing a disk substrate;

sputter depositing thin film magnetic media layer means on said substrate;

sputter depositing a carbon overcoat over said magnetic media thin film means;

said method, prior to the completion thereof, being operable to provide surface roughness on the exposed outer surface of said deposited carbon overcoat;

causing spaced electrical probes to releasably and biasingly engage spaced portions of said exposed outer surface of said carbon overcoat;

creating a voltage across said spaced electrical probes;

measuring an electrical resistance between the ends of said probes in engagement with peaks comprising peaks of first elevations and second elevations, said second elevations projecting above peaks of said first elevations on said exposed outer surface of said carbon overcoat;

said measured resistance being a function of the wear resistance of said outer surface of said carbon overcoat;

empirically determining, in response to said measured resistance, a degree of surface texturing of said carbon overcoat determining a peaking density of said carbon overcoat by determining the presence of said peaks encountered while measuring said resistance; said measurement of resistance resulting in the breaking of said peaks of said second elevations causing an increase in conductivity of said carbon overcoat;; and determining, in response to said measured resistance-determined wear resistance of said outer surface of said carbon overcoat, and the peaking density and degree of surface texturing thereof, the suitability for use of said carbon overcoat.

2. A method as described in claim 1 further comprising:

throughout a series of said resistance measurements on different media disks, generally maintaining a pressure on each of said electrical probes, urging said probes into said carbon overcoat.

3. A method for empirically determining acceptable wear resistance and surface roughness characteristics of thin film magnetic media disks, said method comprising:

providing a disk substrate;

sputter depositing thin film magnetic media layer means on said substrate;

sputter depositing a protective overcoat over said thin film magnetic media, layer means;

said method, prior to the completion thereof, being operable to provide surface roughness on the exposed outer surface of said deposited protective overcoat;

causing spaced electrical probes to releasably and biasingly engage spaced portions of said exposed outer surface of said protective overcoat on said thin film magnetic media layer means on said disk substrate;

creating a voltage across said spaced electrical probes;

measuring an electrical resistance between the ends of said probes in engagement with peaks comprising peaks of first elevations and second elevations, said second elevations projecting above peaks of said first elevations on said exposed outer surfaces of said protective overcoat;

said measured resistance being a function of the wear resistance of said outer surface of said carbon overcoat;

empirically determining, in response to said measured resistance, a degree of surface texturing of said protective overcoat;

determining a peaking density of said carbon overcoat by determining the presence of said peaks encountered while measuring said resistance;

said measurement of resistance resulting in the breaking of said peaks of said second elevations causing an increase in conductivity of said carbon overcoat;

throughout a series of said resistance measurements on different media disks, generally maintaining a pressure on each of said electrical probes, urging said probes into said protective overcoat.; and determining, in response to said measured resistance-determined wear resistance of said outer surface of said carbon overcoat and the peaking density and degree of surface texturing thereof, the suitability for use of said carbon overcoat.

* * * * *